H. BLUMENBERG, Jr.
COMPOSITION OF MATTER AND PROCESS OF MAKING THE SAME.
APPLICATION FILED FEB. 23, 1917.
1,338,279.
Patented Apr. 27, 1920.
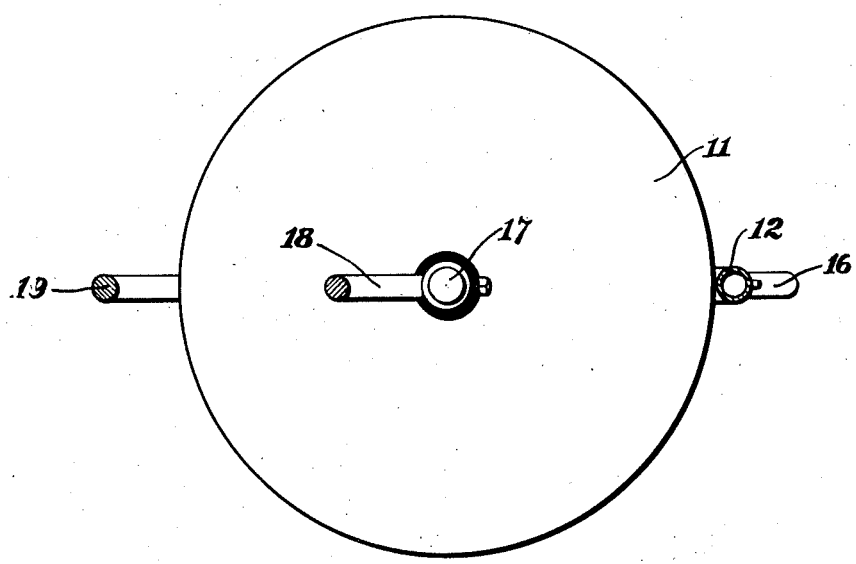
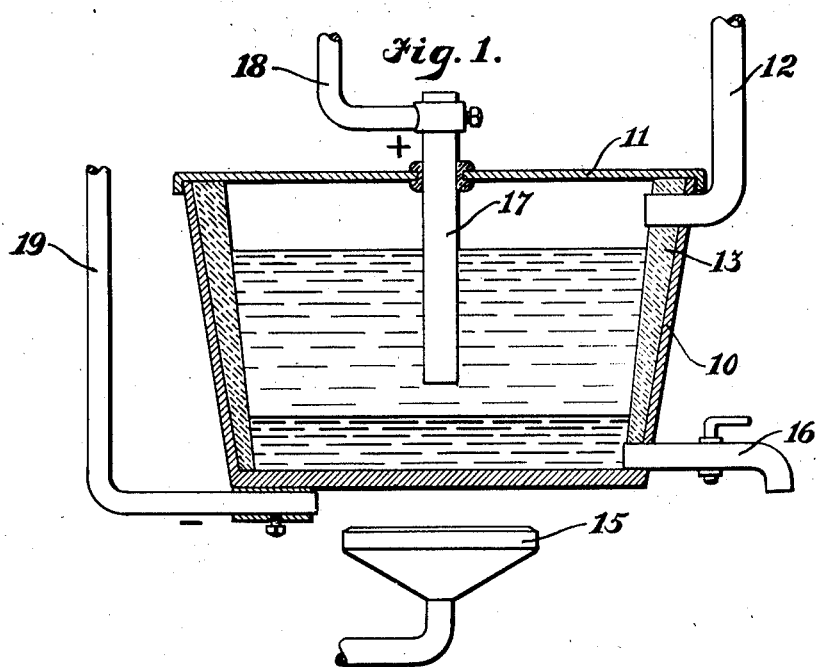
Inventor
Henry Blumenberg Jr.
by Hazard & Miller
Att'ys.

UNITED STATES PATENT OFFICE.

HENRY BLUMENBERG, JR., OF LOS ANGELES, CALIFORNIA, ASSIGNOR TO FRIEDA BLUMENBERG, OF NEW YORK, N. Y.

COMPOSITION OF MATTER AND PROCESS OF MAKING THE SAME.

1,338,279.     Specification of Letters Patent.     Patented Apr. 27, 1920.

Application filed February 23, 1917. Serial No. 150,580.

*To all whom it may concern:*

Be it known that I, HENRY BLUMENBERG, Jr., a citizen of the United States, residing at Los Angeles, in the county of Los Angeles and State of California, have invented new and useful Improvements in Composition of Matter and Processes of Making the Same, of which the following is a specification.

My invention relates to a metal alloy which, when treated with water, will generate either phosphin, arsin and stibin, or a mixture of any two or all three of these, and a process of making said alloy.

In my co-pending application for United States Letters Patent, Serial No. 138,696, filed December 26th, 1916, for a process of destroying scale and the like on citrus trees, I have described the application of phosphin, arsin or stibin in the treatment of citrus trees. The present invention relates to a composition of matter whereby any of the gases just mentioned may be easily and quickly produced by the mere application of water to the compound. The compound itself may be put up in air-tight containers and form an article of commerce.

This invention also relates to a method of exterminating ground squirrels, prairie dogs, and similar animal pests.

It is an object of this invention to form a metal alloy comprising a solid solution of an element capable of generating nascent hydrogen when treated with water, and an element of the nitrogen group such as arsenic, antimony, or phosphorus, or a mixture of these elements, with which nascent hydrogen combines to form arsin, stibin, or phosphin, respectively.

With the above and other objects in view which will appear as the description proceeds, my invention consists in the alloy, the steps in the process of making the same, and the method of the application of said alloy.

In the accompanying drawings which form a part of this specification, I have illustrated, by way of example, an apparatus suitable for carrying on my process of making the alloy:

Figure 1 of the drawing shows a vertical section of the apparatus.

Fig. 2 is a plan view of the apparatus.

10 designates a metal vessel, preferably iron, provided with a cover 11. A vent pipe 12 leads from the upper part of the vessel. The lateral walls of the vessel 10 are lined with a basic lining 13, preferably magnesite. 15 designates a burner for heating the vessel. A valve-controlled outlet 16 leads from the bottom of the vessel 10. In the upper part of the vessel a carbon electrode 17 is provided which forms an anode, while the bottom of the vessel 10 forms a cathode. Both electrodes are provided with conductors 18 and 19, respectively, connected to a suitable source of electric energy (not shown).

Metallic lead, preferably granular sodium hydroxid and arsenic oxid is placed in the vessel 10. The reagents are mixed and the vessel is heated by the burner 15, melting the mass. The basic lining serves to protect the iron of the vessel from the action of the sodium hydroxid. The lead collecting on the bottom of the vessel protects it from the actions of the sodium hydroxid. The anode 17 should be placed in the center of the molten mass and should extend to about an inch above the molten lead, and an electric current, from six to ten volts, is passed through the molten mass. The electric current will carry the sodium and the arsenic into the body of the lead, forming a dull gray crystalline alloy of arsenic, lead and sodium. Carbon monoxid and steam will pass through the vent pipe 12. The oxygen of the arsenic oxid combines with the carbon of the electrode, while the hydroxyl radical of the sodium hydroxid will split up into water and oxygen, the latter likewise forming carbon monoxid with the carbon of the electrode.

The lead in the alloy serves the purpose of facilitating the combination of the sodium and arsenic and acts as a carrier.

In place of sodium hydroxid, any other hydroxid of an alkali metal, or alkaline earth metal, may be used, or the metals may be substituted.

The process just described is merely an example of forming an alloy or metallic mass capable of generating arsin when the alloy is treated with water. The process is applicable when antimony phosphid or antimony arsenid is to be produced. Antimony is placed in the iron vessel together with phosphorus, and after the melting of the mass and treatment with electric current a white brittle alloy of antimony and phosphorus is formed. The antimony may have as much as fifteen per cent. phosphorus in solid solution. When antimony arsenid is to be produced, the antimony is placed in the vessel together with arsenic and boric acid. After electric treatment, a crystalline alloy of antimony, boron and arsenic is formed. It should be noted, however, that the antimony combinations do not react like the phosphorus or arsenic combinations; the antimony combinations have a greater tendency to generate hydrogen in excess.

The alloy formed by my process may be put up in air-tight metal cans. When it is desired to use the alloy, it is placed in water, which, re-acting therewith, will generate arsin, phosphin, or stibin, respectively, which, as described in my co-pending application, Serial No. 138,696, may be used as a fungicide or vermicide in the treatment of citrus trees and the like.

In the extermination of ground squirrels, gophers, prairie dogs, and similar animal pests, the alloy is placed in the underground passage-ways of these animals and then moistened with water. When the ground is damp, the moistening is not necessary. Any opening leading to the atmosphere is then closed up. The poisonous gas will be generated and, filling all the passage-ways, will kill the animals.

While I have shown the preferred method of producing an alloy which, on contact with water, is capable of generating arsin, phosphin or stibin, respectively, or a mixture of these, it will be understood that I do not confine myself to the exact steps described, as various changes may be made by those skilled in the art without departing from the spirit of my invention as claimed. For example, an alloy of arsenic and phosphorus may be made by fusing these elements together. This alloy, however, will not generate either phosphin or arsin by mere application of water. It is necessary to treat the alloy with alkaline solution, such as sodium hydroxid or the like, whereupon phosphin and arsin will be generated.

I claim:

A method of making an alloy, comprising a metal and an element of the nitrogen group, excepting bismuth and nitrogen, and capable, on contact with water, of generating a volatile hydrid of said element, comprising fusing said metal and a compound of said element and passing an electric current of low voltage through the fused mass to produce said alloy.

In testimony whereof I have signed my name to this specification.

HENRY BLUMENBERG, Jr.